United States Patent [19]

Nguyen et al.

[11] Patent Number: 5,692,194

[45] Date of Patent: Nov. 25, 1997

[54] SEQUENTIAL INFORMATION INTEGRATION SERVICE FOR AUTOMATICALLY TRANSFERRING A MOST RECENT DATA ENTITY BETWEEN A PLURALITY OF PROGRAM MODULES AND A STORAGE IN A COMPUTER

[75] Inventors: Ha T. Nguyen, Anaheim; Willard H. Barrett, Garden Grove, both of Calif.

[73] Assignee: Hughes Aircraft Company, Los Angeles, Calif.

[21] Appl. No.: 69,053

[22] Filed: May 24, 1993

[51] Int. Cl.$^6$ .................................................. G06F 17/30
[52] U.S. Cl. ........................ 395/680; 395/619; 395/620; 395/617
[58] Field of Search ............... 364/DIG. 1, DIG. 2, 364/963, 974.5, 948.2, 286, 286.5; 395/650, 700, 600, 155, 161, 619, 620, 680, 617

[56] References Cited

U.S. PATENT DOCUMENTS

| | | | |
|---|---|---|---|
| 3,984,817 | 10/1976 | Barbour et al. | 395/600 |
| 4,555,759 | 11/1985 | McCaskill et al. | 364/300 |
| 4,791,556 | 12/1988 | Vilkaitis | 364/200 |
| 5,047,981 | 9/1991 | Schwartz et al. | 364/300 |
| 5,075,847 | 12/1991 | Fromme | 395/700 |
| 5,159,669 | 10/1992 | Trigg et al. | 395/159 |
| 5,220,657 | 6/1993 | Bly et al. | 395/425 |
| 5,301,326 | 4/1994 | Linnett et al. | 395/700 |
| 5,375,200 | 12/1994 | Dugan et al. | 395/159 |

FOREIGN PATENT DOCUMENTS 0 534 409 A3  3/1993  European Pat. Off. ..

OTHER PUBLICATIONS

Lubkin, David C. Dsee: A Software Configuration Management Tool Hewlett–Packard Journal, Jun. 1991 v42 n3 p. 77(7).

Black, Carla F. 5.1's Fantastic File Clerk: Become Efficient With Document Summary, Wordperfect Magazine, Aug. 1991 p. 65(5).

Ehrman, Dan Starting Paradox 3.5 DBMS Nov. 1991 v4 n12 p. 38(3).

Halpern, Ruth Fields of Files, Lan, Technology Sep. 1991 v7 n9 p. 48(9).

Cypher, Allen, Ehger:Programming Repetitive Task by Example, CHI '91, Conference Proceedings, New Orleans, Louisiana Apr. 27–May 2, 1991.

IBM Technical Disclosure Bulletin, vol. 30, No. 10, p. 77, Mar. 1988, New York, "Automatic Loading in Memory of Most Recent Used Data File".

EXE Magazine, vol. 4, Issue 2, Jul. 1989, pp. 44–50, UK, A. Flower, "File Selection for Presentation Manager".

*Primary Examiner*—Lucien U. Toplu
*Attorney, Agent, or Firm*—G. S. Grunebach; M. W. Sales; W. K. Denson-Low

[57] ABSTRACT

A number of program modules (32,34,36) are sequentially controlled by a procedural user interface (PUI) 38 and an operating system (40) to perform tasks. Transfer of files or other data entities between the modules (32,34,36) and a storage (13) is seamlessly integrated by a sequential information integration service (SIIS) (50). For reading a file from the storage (13), a the PUI 38 or the operating system (40) generates a read command including a filename designation which can include a pathname, complete filename or wildcard characters. The read command can also include one or more arguments such as a user or group access code and an error message to display if the required file is not found. In an automatic mode, the service (50) automatically selects the most recent file corresponding to the filename designation and arguments, or displays the error message if a file meeting these criteria is not found. In a manual mode, the read command includes a manual selection argument which controls the service (50) to display a list of files (64) corresponding to the filename designation and arguments in a dialog box or window (60) for manual selection. The read command can further include a prompt message (62) for display in the window (60) together with the list of files (64).

13 Claims, 7 Drawing Sheets

5,692,194

SEQUENTIAL INFORMATION INTEGRATION SERVICE FOR AUTOMATICALLY TRANSFERRING A MOST RECENT DATA ENTITY BETWEEN A PLURALITY OF PROGRAM MODULES AND A STORAGE IN A COMPUTER

BACKGROUND OF THE INVENTION

1. Field of the Invention

The present invention generally relates to the art of computers, and more specifically to a sequential information integration service for integrating transfer of files and other data entities between a plurality of program modules and a storage in a computer.

2. Description of the Related Art

Software developers have conventionally designed programs for commercial and personal use which perform a single function such as word processing. Integrated software packages are also available which include, for example, a word processor, a data base and a spreadsheet.

However, it is often desired to perform functions which are not found in a single software package, such as creating and editing a document, and faxing the document to a remote location. The conventional method for performing this task is to use a word processor to create and edit the document, and the save the document as a file on a hard disk or other storage media. A fax program is then called to read the stored file from the hard disk and fax it to the desired location.

The prior art method is complicated, and requires substantial technical expertise on the part of the user. This is inefficient, and is especially undesirable in the majority of business applications in which the users are not computer experts and cannot spare time from their primary jobs for in-depth computer training.

Another problem involved in sequentially using several different programs is transferring the proper data files between the different applications. For example, a user might utilize a word processor to create, edit and save several different documents with different filenames at different times. At a later time, the user might have to fax one of the files to another location. In order to accomplish this, the user has to search the storage to locate the proper file, and select it for transmission by the fax program.

This is disadvantageous in that the user must have technical knowledge of the directory structure of an operating system, and also in that a large number of files of different types might be stored by a number of users in a particular directory. Locating the desired file can be unacceptably time consuming.

Although in some applications a file name can be "hard-coded" and unambiguously identifiable, this is impractical in an application such as word processing since only one data file can be saved with a particular filename.

An emerging trend in program development is to design generic program modules which can be integrated in various combinations to perform a specific task. A procedural user interface (PUI) is a shell which integrates and controls the operation of a number of such program modules.

The PUI interacts with the operating system (UNIX, MS-DOS, etc.) and a windows program to display the tasks or functions which can be performed by the program modules in windows or dialog boxes as text or icon options. This greatly simplifies the operation of the system, and minimizes the amount of technical knowledge required of the user.

An example of a window program suitable for use with a PUI is the Neuron Data Open Interface®, which is available from Neuron Data USA of Palo Alto, Calif. as described in a sales brochure dated May, 1991.

An example of a word processing program module, printer control program module and fax program module which are integrally controlled by a PUI is illustrated in FIG. 1. A general purpose computer 10 includes a processing unit 12 with a mass storage media 13 such as a hard disk, a display screen 14, a keyboard 16 and a mouse 18. A number of "buttons" are displayed in a dialog box or window on the screen 14, including a "CREATE" button 20, an "EDIT" button 22, a "PRINT" button 24 and a "FAX" button 26.

The tasks represented by the buttons 20, 22, 24 and 26 are activated or "launched" by positioning a pointer 28 over the selected button 20, 22, 24 or 26 using the mouse 18, and clicking a button on the mouse 18 to enter the selection.

Although not illustrated in detail, selecting the CREATE button 20 will typically cause the word processing program to run, preceded by a message prompting the user to enter a filename for a new file to be created. Selecting the EDIT button 22 will also typically cause the word processing program to run, preceded by a message prompting the user to enter the filename of a file to be edited.

Especially if the file to be edited was not created recently, the user may have forgotten the filename. In this case, the user will enter a null filename, question mark or the like and the word processing program will control the operating system to display the directory structure of the storage 13, enabling the user to locate the desired file and select it for editing.

A large number of files having similar names may have been stored in the storage 13 by different users, and considerable time, effort, trial and error may be required to locate the desired file.

After a file is created and/or edited, the word processing program module enables the user to save the file to the storage 13 and exit to the PUI shell as illustrated in FIG. 1.

The PRINT button 24 enables the user to print out a desired file and thereby produce a hard copy. The FAX button 26 enables the user to fax a desired file to a specified location. However, the PRINT and FAX functions are similar to the EDIT function in that the user must either know the filename of the desired file in advance, or search the directory structure to locate it.

SUMMARY OF THE INVENTION

In accordance with a method of the present invention, a number of program modules are sequentially controlled by a procedural user interface shell and an operating system to perform tasks.

Transfer of files and other data entities including blocks of object code (objects) and database entities between the modules and the storage is seamlessly integrated by a sequential information integration service (SIIS). For reading a file from the storage, for example, a module generates a read command including a filename designation which can include a pathname, complete filename or wildcard characters. The read command can also include one or more arguments such as a user or group access code and an error message to display if the required file is not found.

In an automatic mode, the service automatically selects the most recent file corresponding to the filename designation and arguments, or displays the error message if a file meeting these criteria is not found.

In a manual mode, the read command includes a manual selection argument which controls the service to display all files corresponding to the filename designation and arguments in a window or dialog box for manual selection. The read command can further include a prompt message for display in the dialog box together with the files.

The sequential information integration service is embodied as a software program written in source code, such as in the "C" programming language, and complied into object code for execution. The program consists of modules in the form of routines and subroutines which perform the required functions, including a command parser, an automatic file selector, a display controller and a manual file selector.

The present sequential information integration service seamlessly integrates the program modules with little or no attention from the user. In a case in which a file to be read must be manually selected, only the appropriate files are displayed, rather than an entire directory structure as in the prior art, greatly reducing the time and training required for a user to operate the system.

These and other features and advantages of the present invention will be apparent to those skilled in the art from the following detailed description, taken together with the accompanying drawings, in which like reference numerals refer to like parts.

DETAILED DESCRIPTION OF THE INVENTION

The present invention provides a sequential information integration service for integrating transfer of data entities between a plurality of program modules and a storage in a computer.

Although a preferred embodiment of the invention is described and illustrated in which the data entities are files which are transferred between program modules and a non-volatile mass storage media, the invention is not so limited, and any other applicable types of data entities, such as blocks of object code (objects) in memory, database entities, etc. can be advantageously transferred using the present system.

Figure 1:
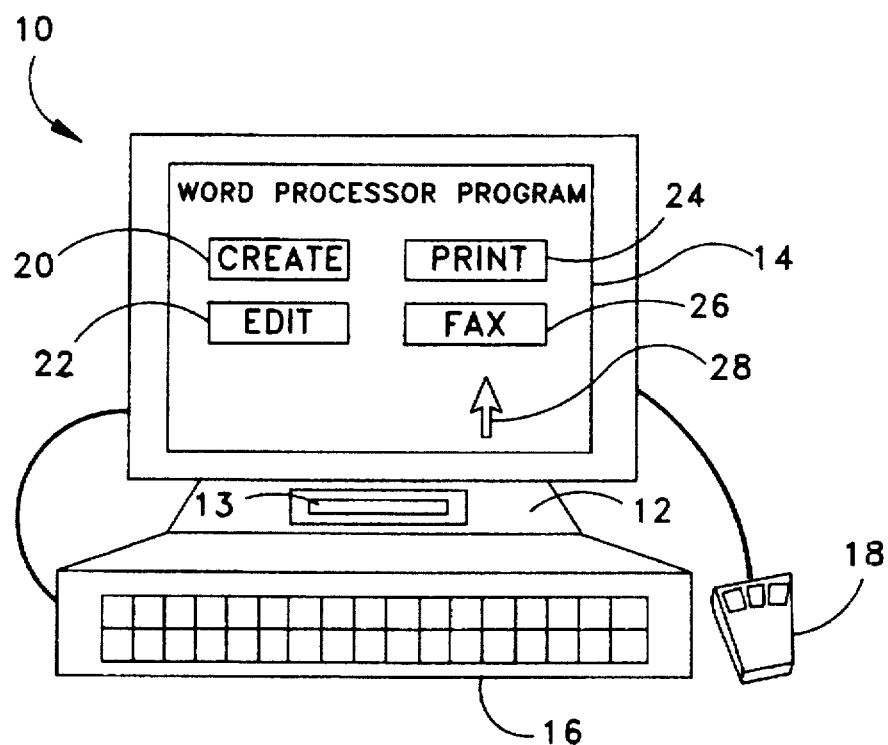
FIG. 1 is a pictorial view of a general purpose computer programmed with a procedural user interface (PUI) for integrating number of program modules.
Figure 2:
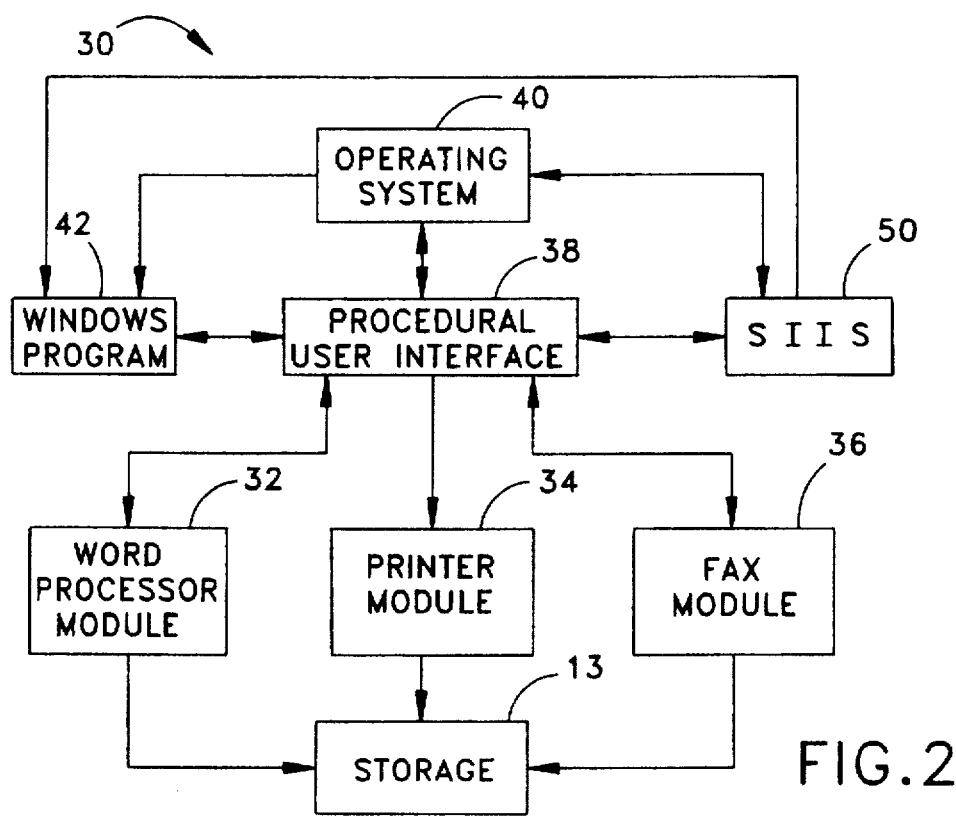
FIG. 2 is a block diagram illustrating the architecture of a sequential information integration service (SIIS) embodying the present invention in combination with an operating system and program modules in the computer of FIG. 1.

An exemplary software system 30 for implementing the functions described with reference to FIG. 1 in accordance with the improvement of the present invention is illustrated in FIG. 2. The system 30 includes a word processor program module 32, a printer program module 34 and a fax program module 36. A procedural user interface (PUI) 38 interacts with an operating system 40 such as UNIX and a windows program 42 such as Neuron Data Open Interface® for integrating the operation of the modules 32, 34 and 36.

A sequential information integration service (SIIS) 50 embodying the present invention interacts with the PUI 38, operating system 40 and windows program 42 for seamlessly integrating transfer of files (data entities) between the modules 32, 34 and 36 and the storage 13.

The PUI 38 includes macros or scripts which are activated when the buttons 20, 22, 24 and 26 are selected by the mouse 18 and pointer 28. The SIIS 50 can be called from one of PUI scripts, or by the operating system 40. The script activated by the "CREATE" button 20 controls the word processor module 32 to run, preceded by a message prompting the user to enter a filename (specifier) for the new file to be created. The scripts activated by the buttons 24 and 26 cause the printer module 34 and the fax module 36 to run respectively.

Figures 3, 4:
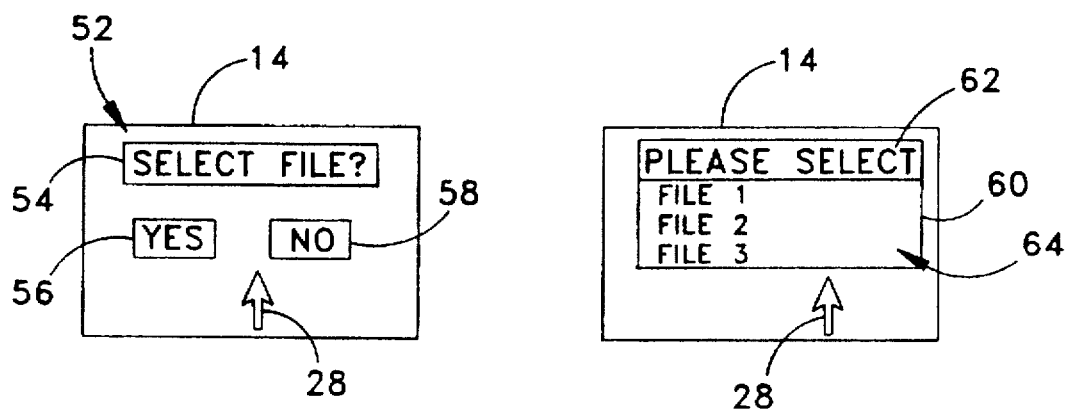
FIGS. 3 and 4 are diagrams illustrating a manual file selection option of the SIIS.

The scripts activated by the buttons 22, 24 and 26 cause a dialog box or window 52 to be displayed as illustrated in FIG. 3. The window 52 includes a prompt message 54 such as "SELECT FILE", a "YES" button 56 and a "NO" button 58. The buttons 56 and 58 enable the user to select the automatic or manual mode of operation of the SIIS 50 respectively using the mouse 18 and pointer 28.

For reading a file from the storage 13, the PUI 38 or the operating system 40 generates a read command including a filename designation (data entity designation) which can include a pathname, complete filename or wildcard characters. The read command can also include one or more arguments (data entity arguments) such as a user or group access code and an error message to display if the required file is not found.

In the automatic mode as selected by the NO button 58, the SIIS 50 automatically selects the most recent file in the storage 13 corresponding to the filename designation and arguments, or displays an error message if a file meeting these criteria is not found.

In the manual mode as selected by the YES button 56, a manual selection argument is added to the read command which controls the SIIS 50 to display the filenames (specifiers) of all files corresponding to the filename designation and arguments in a dialog box or window 60 as illustrated in FIG. 4.

The window 60 includes a prompt message 62 such as "PLEASE SELECT" and a list 64 of the files which meet the criteria. The user is then able to select the desired file from the list 64 using the mouse 18 and pointer 28. After selection of the desired file in the automatic mode or the manual mode, the PUI 38 causes the selected program module 32, 34 or 36 to load the selected file and run.

An exemplary syntax for the read command is %GET-FILE [–n (or –d) pathname/regular_expression] [–u] [–g] [–e "error string"] [–m "prompt message"]. %GETFILE is the program name of the SIIS 50 as called from the PUI 38.

−n is a file argument designating automatic mode operation.
−d is a file argument designating manual mode operation.

Pathname indicates the subdirectory in which the desired file is to be found. Regular expression is a filename designation which can include a complete filename with or without an extension, a partial filename and wildcard characters, or just wildcard characters.

−e is a file argument indicating that a user error message is being supplied. "Error string" is the user supplied error message. −m is a file argument indicating that a user prompt message 62 is being supplied. "Prompt message" is the user supplied prompt message 62.

−u is a user authorization access code file argument which is assigned to each user and indicates the file areas or types of files in the storage 13 to which the user is to be allowed access. −q is similar to −u, but is a group authorization code file argument which indicates the working group to which the user is assigned.

The user and group access codes are stored in the PUI 38 or the operating system 40, and are normally used to prevent users from having access to sensitive information for which they have no legitimate use. The access codes can alternatively be used for convenience in making visible only the user's own files in the storage 13.

Figure 5:
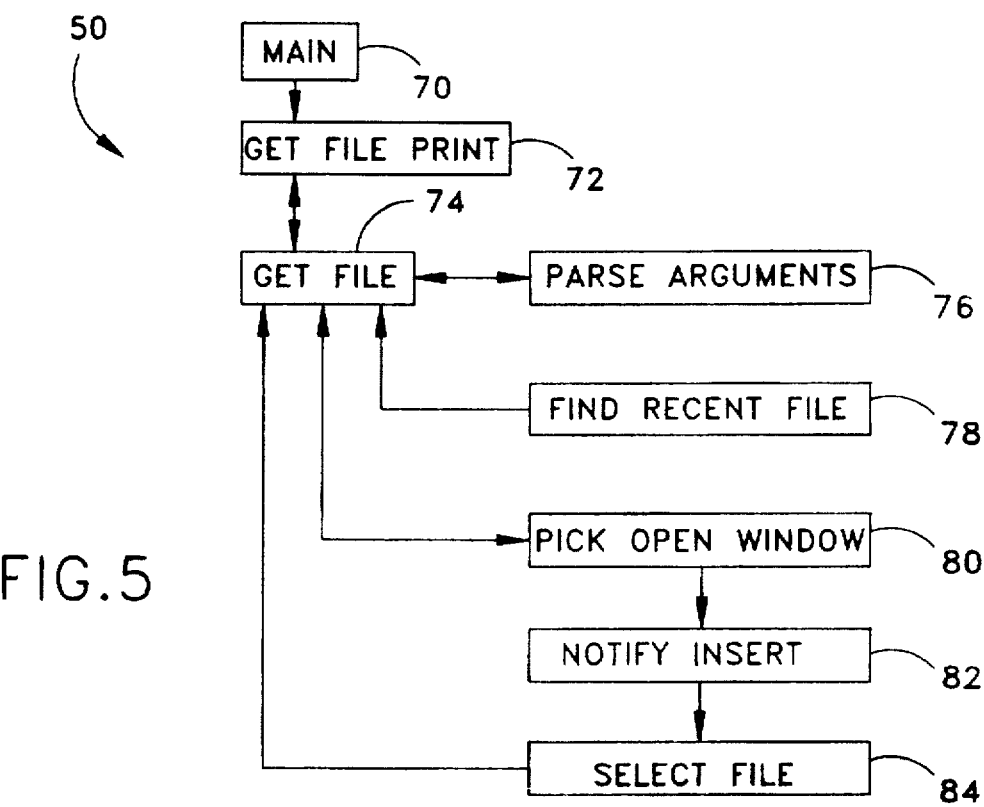
FIG. 5 is a block diagram illustrating the architecture of the SIIS.

The SIIS 50 is preferably written in the "C" programming language and complied for use, although the invention is not limited to any particular programming language or structure. As illustrated in FIG. 5, the SIIS 50 includes a MAIN program routine 70 which is called by the PUI 38 or the operating system 40 using the read command.

The MAIN routine 70 calls a GET FILE PRINT routine 72 which in turn calls a GET FILE subroutine 74. The GET FILE routine 74 calls a PARSE ARGUMENTS subroutine 76, a FIND RECENT FILE subroutine 78 and a PICK OPEN WINDOW routine 80.

The PICK OPEN WINDOW routine 80 calls a NOTIFY INSERT routine 82 which in turn calls a SELECT FILE routine 84 which returns to the GET FILE subroutine 74. Although not illustrated or described in detail, the SIIS 50 also includes an appropriate error handling routine and appropriate housekeeping functions.

Figure 6:
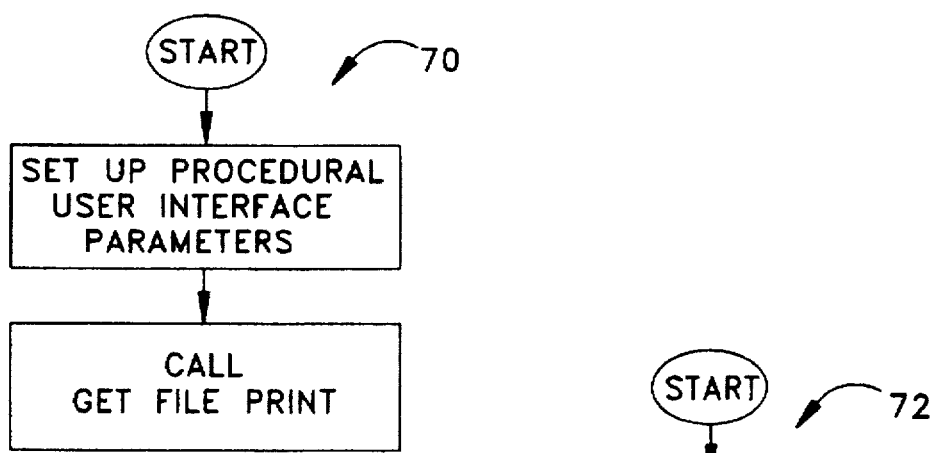
FIG. 6 is a flowchart illustrating the operation of a "MAIN" program routine of the SIIS.

As illustrated in FIG. 6, the MAIN routine sets up interface parameters for the PUI 38, and calls the GET FILE PRINT subroutine 72.

Figure 7:
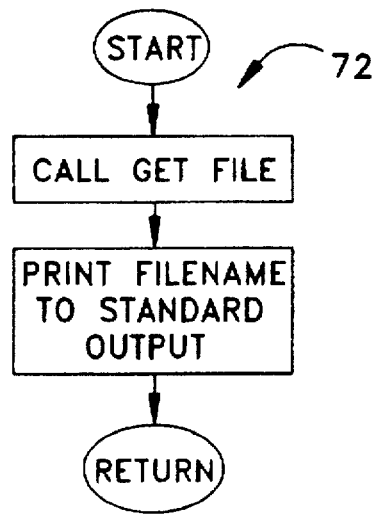
FIG. 7 is a flowchart illustrating the operation of a "GET FILE PRINT" routine.

The GET FILE PRINT routine 72, as illustrated in FIG. 7, calls the GET FILE subroutine 74 to get the filename of the desired file, and returns the filename to the PUI 38 or to the operating system 40. In the UNIX operating system, the filename is printed to the standard output.

Figure 8:
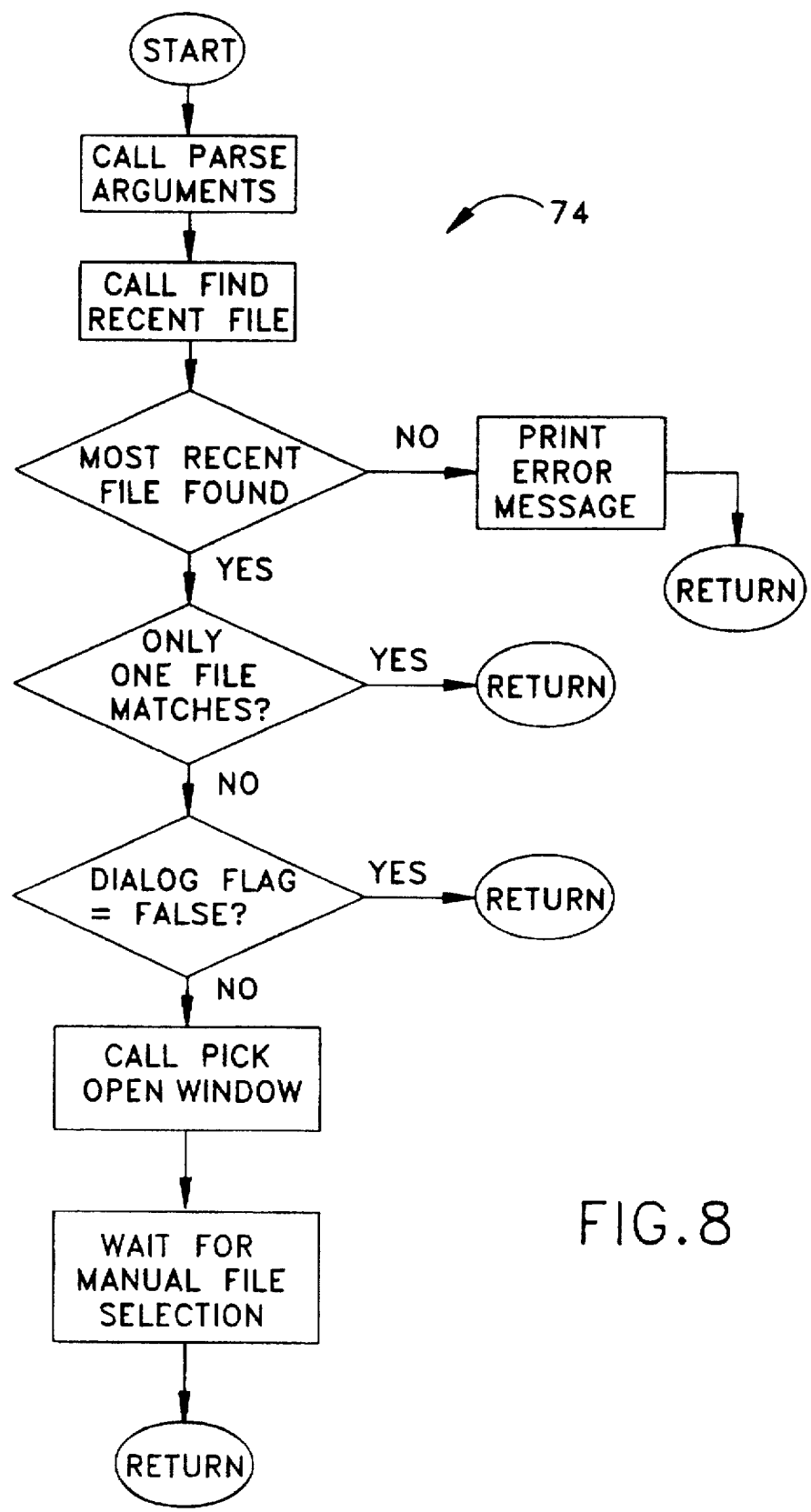
FIG. 8 is a flowchart illustrating the operation of a "GET FILE" subroutine.
Figure 9:
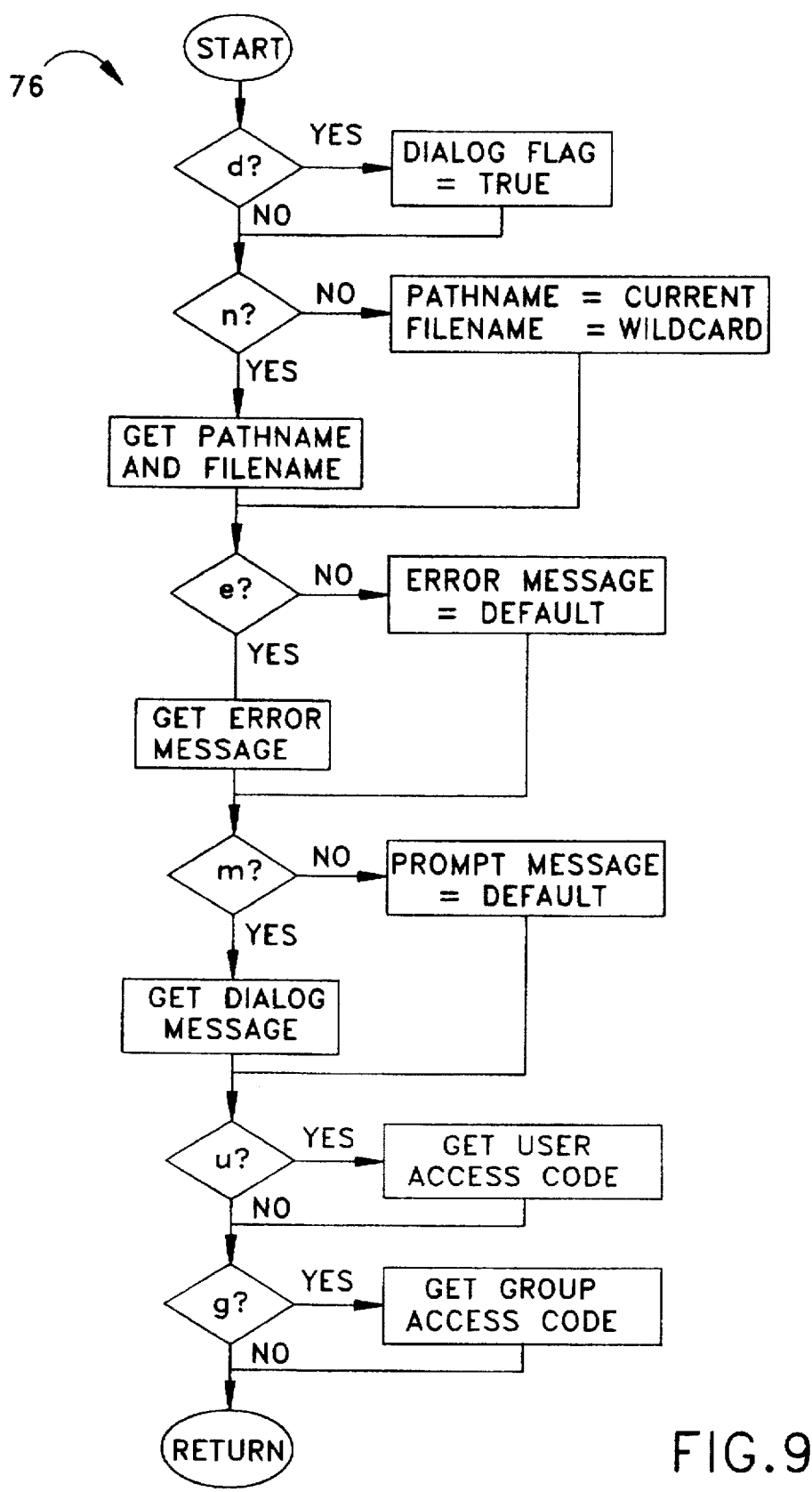
FIG. 9 is a flowchart illustrating the operation of a "PARSE ARGUMENTS" subroutine.

The GET FILE subroutine 74 is illustrated in FIG. 8. The first operation the GET FILE routine 74 performs is to call the PARSE ARGUMENTS subroutine 76 which is illustrated in FIG. 9. The PARSE ARGUMENTS subroutine 76 separates the read command into its constituent parts. If the −d file argument is discovered in the read command, a dialog flag is set to logical TRUE to indicate that the manual mode of operation has been selected.

If the −n file argument is not discovered in the read command, it indicates that the caller did not specify a particular filename designation. The pathname is set to a default value, preferably the current directory, and the filename is set to a wildcard. If the −n file argument is discovered in the read command, the pathname and filename are parsed.

If the −e file argument is not discovered in the read command, the error message is set to a default value. It the −e file argument is discovered, the user supplied error message "error string" is parsed.

The subroutine PARSE ARGUMENTS then looks for the −m file argument in the read command. If it is not discovered, the prompt message is set to a default value. It the file argument −m is discovered in the read command, the prompt message "message string" is parsed.

If the −u file argument is discovered in the read command, the user access code is retrieved from the PUI 38 or the operating system 40 and used as a filter for the subsequent file selection operation. If the −g file argument is discovered in the read command, the group access code is similarly retrieved from the PUI 38 or the operating system 40.

Figure 10:
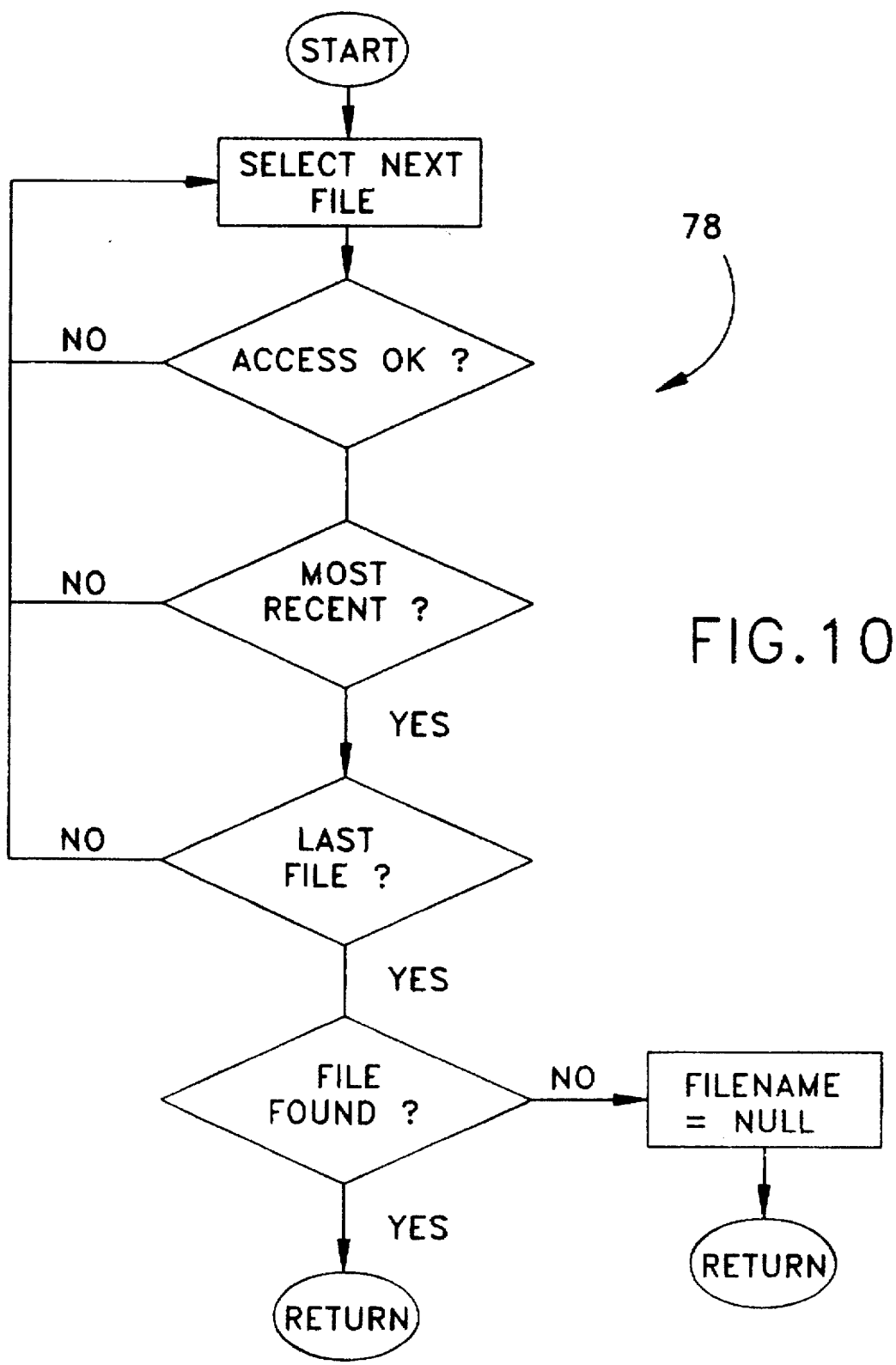
FIG. 10 is a flowchart illustrating the operation of a "FIND RECENT FILE" subroutine.

After the PARSE ARGUMENTS subroutine 76 has completed parsing the read command and returns to the GET FILE subroutine 74, the FIND RECENT FILE subroutine 78 is called as illustrated in FIG. 10. The FIND RECENT FILE subroutine 78 examines each file in the storage 13 corresponding to the filename designation. If the −u or −g file argument was discovered in the read command, each file is checked to determine it is authorized for the specified user or group. The date and time the file was last modified is examined and compared with the most recent file which was previously discovered.

If the FIND RECENT FILE subroutine 78 finds a most recent file in the storage 13 which meets the specified criteria, it returns the filename to the GET FILE subroutine 74. If no file matching the criteria was discovered, the FIND RECENT FILE subroutine 78 sets the filename to null and returns to the GET FILE subroutine 74.

After program control is returned from the FIND RECENT FILE subroutine 78 to the GET FILE subroutine 74, the filename which was returned is examined. If the filename is the null string, indicating that the desired file was not discovered, the GET FILE subroutine 74 returns to the GET FILE PRINT routine 72 with an appropriate error message.

If only one file was discovered which matches the specified criteria, indicating that the caller designated the complete filename in the read command, the GET FILE subroutine 74 returns to the GET FILE PRINT routine 72 with the filename. This action will be performed even if the −d file argument was discovered in the read command, since selection of a file from a list which only includes itself is redundant.

If the −d file argument was not present in the read command and the dialog flag is logically FALSE, indicating automatic operation, the GET FILE subroutine 74 returns to the GET FILE PRINT subroutine 72 with the filename. If the dialog flag is logically TRUE, indicating the manual selection operation, the GET FILE subroutine 74 calls the PICK OPEN WINDOW routine 80.

Figure 11:
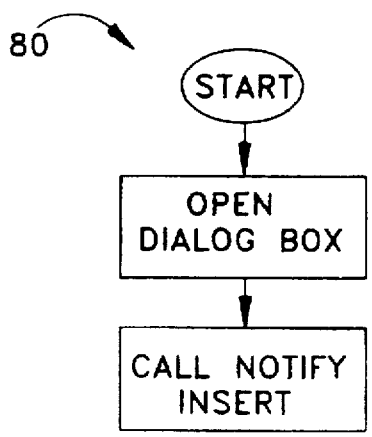
FIG. 11 is a flowchart illustrating the operation of a "PICK OPEN WINDOW" routine.

The PICK OPEN WINDOW routine 80 is illustrated in FIG. 11, and controls the windows program 42 to open the dialog box or window 60 and then calls the NOTIFY INSERT routine 82.

Figure 12:
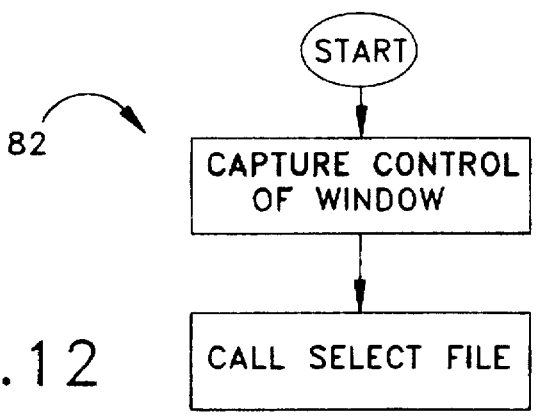
FIG. 12 is a flowchart illustrating the operation of a "NOTIFY INSERT" routine.

The NOTIFY INSERT routine 82 is illustrated in FIG. 12, and monitors the windows program 42 to capture control of the window 60. The NOTIFY INSERT routine 82 then calls the SELECT FILE routine 84.

Figure 13:
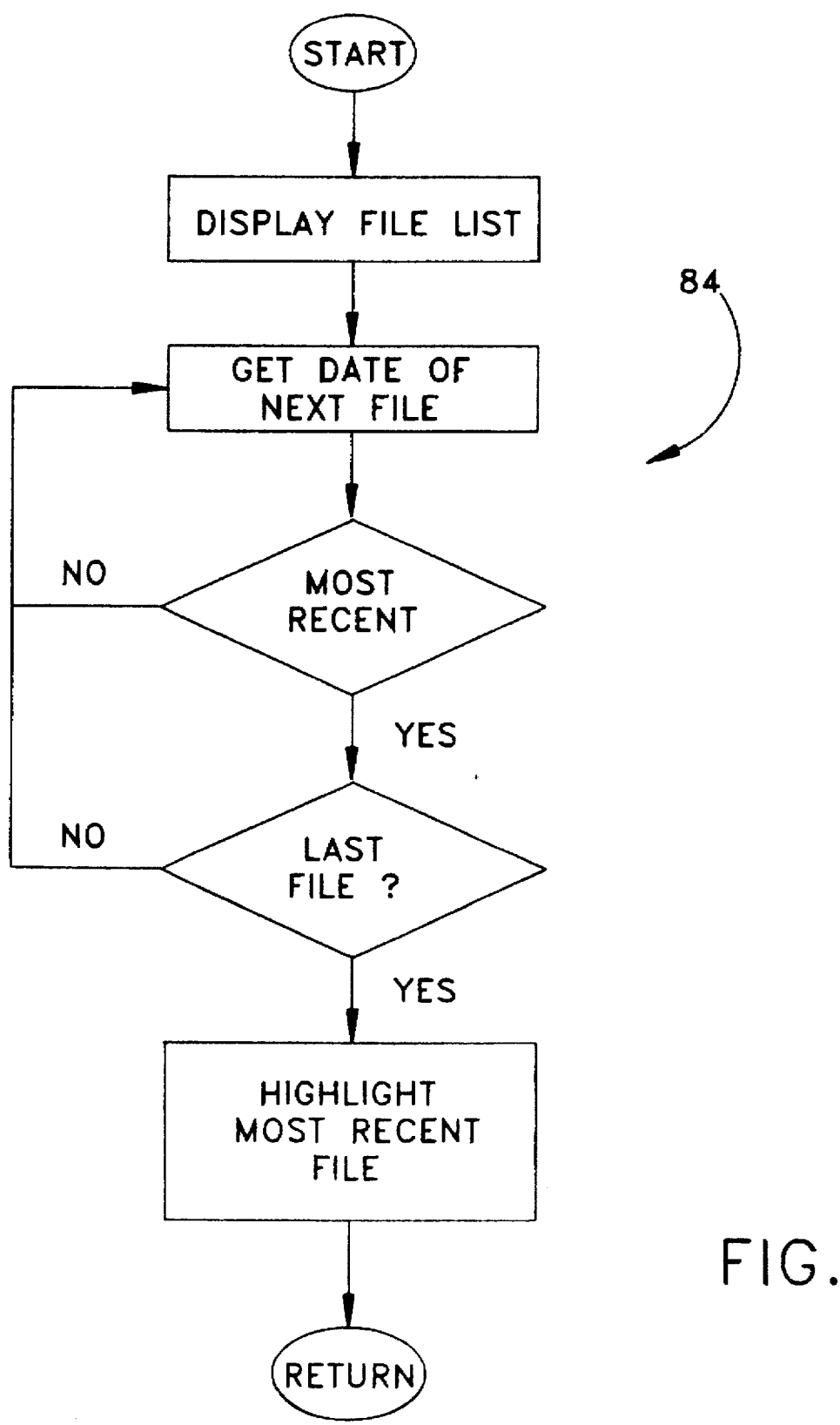
FIG. 13 is a flowchart illustrating the operation of a "SELECT FILE" routine.

As illustrated in FIG. 13, the SELECT FILE routine 84 displays the prompt message 62 (user supplied or default) and a list of all files which correspond to the filename designation and file arguments in the read command in the window 60, and examines the files in the list in a manner similar to the FIND RECENT FILE subroutine 78 to discover and highlight the most recent file and then return to the GET FILE subroutine 74.

The GET FILE subroutine 74 waits for the user to select a file from the list 64 using the mouse 18 and pointer 28. Upon selection, the GET FILE subroutine 74 returns to the GET FILE PRINT subroutine 72 which in turn returns to the caller with the selected filename.

While an illustrative embodiment of the invention has been shown and described, numerous variations and alternate embodiments will occur to those skilled in the art, without departing from the spirit and scope of the invention.

For example, the window 52 and associated operations described with reference to FIG. 3 can be omitted, and the control flow can proceed directly from the main menu of FIG. 1 to the file list 64 display of FIG. 4.

The files or other data entities can be represented by specifiers other than filenames, such as shape types for objects corresponding to graphic images in volatile memory.

Accordingly, it is intended that the present invention not be limited solely to the specifically described illustrative embodiment. Various modifications are contemplated and can be made without departing from the spirit and scope of the invention as defined by the appended claims.

These modifications include, but are not limited to, the sequential integration of database query results through structured query language (SQL) commands as well as sequential integration of objects such as text, graphic images, and sounds which are "cut and pasted" through clipboards as embodied in the Apple Macintosh Operating System®.

We claim:

1. A sequential information integration service for transferring files between a plurality of program modules and a storage of a computer, said computer having a control system and multiple files with different filenames in its storage, each said file having at least one version that is stamped with the date and time it was last modified by any one of said program modules, said program modules using said files to execute program functions, comprising:

a command parser for parsing a read command, which supports one or more filename designations and one or more file arguments that together designate a complete filename or a partial filename, from a requesting program module to specify a subset of the files in the storage, when said read command designates the complete filename, said subset includes only said one file, with its one or more versions, whose filename matches said complete filename, and when said read command designates the partial filename, said subset includes a plurality of said files, with their one or more versions, whose different filenames each include said partial filename; and an automatic file selector connected to automatically search said subset, compare the dates and time of the most recent versions of each said file, select the one file that was most recently modified, and transfer the most recent version of the selected file from the storage to the requesting program module.

2. A service as in claim 1, in which:

files are stored in the storage in accordance with access codes;

a first one of said file arguments is a specific access code; and the automatic file selector selects said most recent file only from files which are stored in the storage in accordance with said specific access codes.

3. A sequential information integration service for transferring data entities between a plurality of program modules and a storage of a computer having a control system and multiple data entities with associated specifiers in its storage, said program modules using said data entities to execute program functions, comprising:

a command parser for parsing a read command, that supports one or more data entity designations and one or more data entity arguments including a manual selection argument as a first one of said data entity arguments, from a requesting program module to specify a data entity group which includes a subset of the data entities in the storage;

an automatic: data entity selector connected to automatically search said data entity group, select the one data entity that was most recently used by any of the program modules, and transfer the selected data entity from the storage to the requesting program module;

a display controller for disabling the automatic data entity selector from transferring the most recent data entity and for displaying the specifiers in the storage that are associated with the data entities in said data entity group in response to said manual selection argument; and a manual data entity selector for enabling manual selection of a displayed specifier for transferring the associated data entity from the storage into said module.

4. A service as in claim 3, in which:

data entities are stored in the storage in accordance with access codes;

said read command includes a specific access code as a second one of said data entity arguments; and the display controller displays only specifiers of data entities which are stored in the storage in accordance with said specific access code.

5. A service as in claim 3, in which said display controller disables the automatic data entity selector after it performs the search, the display controller displaying the specifiers for the data entities in said data group and highlighting the most recent one.

6. A sequential information integration service for transferring data entities between a plurality of program modules and a storage of a computer having a control system and multiple data entities in its storage, said program modules using said data entities to execute program functions, comprising:

a command parser for parsing a read command, that supports one or more data entity designations and one or more data entity arguments of which a first one of said data entity arguments is an error argument that has an associated error message, from a requesting program module to specify a data entity group which includes a subset of the data entities in the storage;

an automatic data entity selector connected to automatically search said data entity group, select the one data entity that was most recently used by any of the program modules, and transfer the selected data entity from the storage to the requesting program module; and a display controller that displays said error message in response to said data entity group being empty.

7. A sequential information integration service for transferring data entities between a plurality of program modules and a storage of a computer having a control system and multiple data entities in its storage, said program modules using said data entities to execute program functions, comprising:

a command parser for parsing a read command, that supports one or more data entity designations and one or more data entity arguments of which a first one of said data entity arguments is an error argument that has an associated error message, from a requesting program module to specify a data entity group which includes a subset of the data entities in the storage;

an automatic data entity selector connected to automatically search said data entity group, select the one data entity that was most recently used by any of the program modules, and transfer the selected data entity from the storage to the requesting program module; and a display controller that displays said error message in response to said error argument being included in said read command and said data entity group being empty, and otherwise displays a default error message in response to said data entity group being empty.

8. A sequential information integration service (SIIS) for transferring data entities between a plurality of program modules and a storage of a computer, said computer having a control system and multiple data entities in its storage, said program modules using said data entities to execute program functions, comprising:

an operating system which is capable of generating a read command that supports one or more data entity designations and one or more data entity arguments from a requesting program module; and a procedural user interface which interacts with the operating system for controlling the program modules and is also capable of generating said read command, a command parser for parsing said read command to specify a data entity group which includes a subset of the data entities in the storage; and an automatic data entity selector connected to automatically search said data entity group, select the one data entity that was most recently used by any of the program modules, and transfer the selected data entity from the storage to the requesting program module.

9. A method of selecting a data entity to be read from a storage of a computer into any one of a plurality of program modules in accordance with a read command generated by a requesting program module, said storage storing a plurality of data entities with different entity names, each said data entity having at least one version that is stamped with the date and time it was last modified by one of the program modules, said read command supporting one or more data entity designations and one or more data entity arguments that together designate a complete or partial entity name, comprising the steps of:

(a) parsing said read command into its constituent parts to extract said data entity designations and said data entity arguments that are included in said read command to specify a subset of the data entities in the storage, when said read command designates the complete entity name, said subset includes only said one data entity, with its one or more versions, whose entity name matches said complete entity name, and when said read command designates the partial entity name, said subset includes a plurality of said data entities, with their one or more versions, whose different entity names each include said partial entity name;

(b) searching the storage to discover all data entities that are members of said subset;

(c) selecting the one data entity that was most recently used by any of the program modules by comparing the dates and times of the most recent versions of each said data entity in the subset; and (d) transferring the most recent version of the selected data entity from the storage into the requesting program module.

10. A method as in claim 9, in which no data entity designation is discovered in step (a), further comprising replacing step (b) with the following step:

(e) searching the storage to discover all data entities corresponding to a default data entity designation and said extracted data entity arguments.

11. A method of selecting a data entity to be read from a storage of a computer into any one of a plurality of program modules in accordance with a read command generated by a requesting program module, said read command supporting one or more data entity designations and one or more data entity arguments of which a first one of said data entity arguments is a manual selection argument, comprising the steps of:

(a) parsing said read command into its constituent parts to extract said data entity designations and said data entity arguments that are included in said read command to specify a data entity group which includes a subset of the data entities in the storage and to extract said manual selection argument;

(b) searching the storage to discover all data entities that are members of said data entity group;

(c) selecting the one data entity that was most recently used by any of the program modules;

(d) in the absence of said manual selection command, transferring the selected data entity from the storage into the requesting program module; and (e) in response to said manual selection command, displaying all data entities discovered in step (b) and highlighting the data entity selected in step (c) for manual selection of a data entity for transfer from the storage into the requesting program module.

12. A method of selecting a data entity to be read from a storage of a computer into any one of a plurality of program modules in accordance with a read command generated by a requesting program module, said read command supporting one or more data entity designations and one or more data entity arguments in which a first one of said data entity arguments is an error argument that has an associated error message, comprising the steps of:

(a) parsing said read command into its constituent parts to extract said data entity designations and said data entity arguments that are included in said read command to specify data entity group which includes a subset of the data entities in the storage and to extract said error argument;

(b) searching the storage to discover all data entities that are members of said data entity group;
in response to at least one data entity being discovered in step(b), (c) selecting the one data entity that was most recently used by any of the program modules and (d) transferring the selected data entity from the storage into the requesting program module and
in response to no data entities being discovered in step (b), (e) displaying said error message in response to said error argument and otherwise displaying a default error message.

13. A sequential information integration service, comprising:

a computer that includes (a) a storage for storing a plurality of program modules that represent respective sub-tasks and for storing a plurality of data entities that have respective specifiers, (b) a control system for generating for a requesting program module a read command that supports one or more data entity designations and one or more data entity arguments, including an automatic mode argument and a manual mode argument, and for executing said program modules, and (c) a display;

a command parser for parsing said read command into its constituent data entity designations and arguments to specify a particular data entity group which includes a subset of the data entities in the storage;

an automatic data entity selector for automatically searching said data entities in said data entity group, selecting the one data entity that was most recently used by any of the program modules, and in response to the automatic mode argument transferring the selected data entity from the storage into one of said modules;

a display controller that disables the transference of the most recent data entity in response to the manual mode argument, displays the specifiers in the storage that are associated with the data entities in said entity group on said display, and highlights the selected data entity; and a manual data entity selector for enabling manual selection of a displayed specifier for transferring the associated data entity from the storage into said requesting program module.

* * * * *